United States Patent [19]
van de Ven

[11] Patent Number: 5,005,945
[45] Date of Patent: Apr. 9, 1991

[54] REAR PROJECTION SCREEN AND REAR PROJECTION SYSTEM COMPRISING SUCH A SCREEN

[75] Inventor: Johannes C. van de Ven, Eindhoven, Netherlands

[73] Assignee: U. S. Philips Corporation, New York, N.Y.

[21] Appl. No.: 556,939

[22] Filed: Jul. 19, 1990

Related U.S. Application Data

[63] Continuation-in-part of Ser. No. 467,717, Jan. 19, 1990.

[30] Foreign Application Priority Data

Aug. 22, 1989 [NL] Netherlands .......................... 8902112

[51] Int. Cl.$^5$ .............................................. G03B 21/60
[52] U.S. Cl. ...................................... 350/128; 350/126
[58] Field of Search ................................. 350/126, 128

[56] References Cited

U.S. PATENT DOCUMENTS

| | | | |
|---|---|---|---|
| 4,418,986 | 12/1983 | Yata et al. | 350/128 |
| 4,469,402 | 9/1984 | Yata et al. | 350/128 |
| 4,509,822 | 4/1985 | Clausen et al. | 350/128 |
| 4,561,720 | 12/1985 | Clausen et al. | 350/128 |
| 4,573,764 | 3/1986 | Bradley | 350/128 |
| 4,679,900 | 7/1987 | McKechnie et al. | 350/126 |
| 4,730,897 | 3/1988 | McKechnie et al. | 350/128 |
| 4,762,393 | 8/1988 | Gerritsen et al. | 350/128 |
| 4,773,731 | 9/1988 | Goldenberg et al. | 350/128 |

Primary Examiner—Richard A. Wintercorn
Attorney, Agent, or Firm—John C. Fox

[57] ABSTRACT

In a rear projection screen having a large horizontal viewing angle caused by the shape of the first light-spreading elements (51) provided at the front side of the plate (50) the color shift is corrected by providing second light-spreading elements (61) at the rear side of the plate. The second light-spreading elements are aligned approximately parallel to the first light-spreading elements and have a pitch (p) which is considerably smaller than the pitch of the first light-spreading elements. This screen provides a good color correction while the first and the second light-spreading elements are formed in such a way that the screen can be manufactured on an industrial scale without any problem.

27 Claims, 3 Drawing Sheets

REAR PROJECTION SCREEN AND REAR PROJECTION SYSTEM COMPRISING SUCH A SCREEN

This is a continuation-in-part of application Ser. No. 07/467,717, filed Jan. 19, 1990.

BACKGROUND OF THE INVENTION

The invention relates to a rear projection screen having a front and a rear side for displaying at the front side of the screen a picture supplied by a plurality of primary picture sources arranged at the rear side of the screen, said screen comprising a translucent plate whose front side is provided with a multitude of parallel-arranged first light-spreading elements extending in one direction across the plate for spreading light in a plane perpendicular to the said direction, said elements having steep edges for obtaining total internal reflection and having a top with a portion for transmission and refraction. The invention also relates to a rear projection system comprising such a rear projection screen.

Rear projection screens are used in rear projection systems for video and cinematographic pictures and in various other types of display systems such as radar screens, airplane and ship simulators and microfilm readers. In such display systems a picture generated in a primary picture source is imaged by a system of projection lenses on the rear side of the rear projection screen. The projection screen spreads the incident light in the audience space at the front side of the screen.

Current projection systems for displaying color television or video programs comprise three primary picture sources for the primary colors red, green and blue which are projected on the screen by separate projection lens systems. The light intensity of each primary picture source is maximum on the optical axis of the relevant picture source and the associated projection lens system. Since the three picture sources the arranged beside or above each other, the said axes extend at an angle at the location of the projection screen so that without any further measures the viewer observes a color shift which depends on his position in the audience space.

U.S. Pat. No. 4,573,674 describes a rear projection screen in which this color shift in the horizontal direction is reduced to a minimum. This is achieved by providing vertically extending light-spreading elements at the front side of the screen whose ratio between height and width is at least 1:1 and whose top has a width which is at most half the width at the base, this top having a specially shaped indentation. In this respect the "height" of the element is understood to mean the maximum relief perpendicular to the plane of the screen. Light-absorbing material may be provided in the deep grooves between the elements so that reflection of ambient light is inhibited by the screen and the contrast in the displayed picture is enhanced. The light from the primary picture source incident on the rear side of the screen is guided to the tops of the profile due to total internal reflection on the steep edges so that there is a high transmission for this light. Due to the combination of steep edges and curved flatter tops a broad angular distribution in the horizontal direction is achieved. As a result of the repeated reflections on the edges the spread of light at the front side is largely independent of the position of the primary picture source.

The vertically extending elements spread the light entering the rear side in a horizontal direction in an angle of approximately 85° to the left and right. In the vertical direction the light-spreading elements do not have any noticeable effect so that other measures are to be taken for spreading light in that direction. For example, roughening the rear side of the plate or providing the plate with a light-scattering material as proposed in U.S. Pat. No. 4,573,764. In the article "Ultrawide viewing angle rear projection screen" by R. Bradley et al., published in the magazine "IEEE Transactions on Consumer Electronics", vol. CE 31, no. 3, pp. 185-192 (1985) mention is made of the possibility of providing a so-called "bulk diffusor" in the plate, consisting of grains having a deviating refractive index.

It has been found that large-scale production of a screen as described in U.S. Pat. No. 4,573,764 meets with technical difficulties. Since the screen is manufactured through a replica process by means of a mould, the shape of the light-spreading elements must be introduced into the mould. This is done by means of a cutting tool having the required shape. For a screen having a diagonal dimension of approximately 100 cm, an aspect ratio of 3:4 and a pitch, i.e. the distance between the edge of an element to the same edge of the adjacent element, of 1 mm, the cutting tool is to cut along a distance of approximately 500 meters. For a screen in the proposed HDTV format with an aspect ratio of 9:16, also approximately 60 cm of picture height and a pitch of approximately 0.5 mm, the distance to be cut is approximately 1300 meters.

To prevent the light-spreading elements from changing in shape between the part of the mould which has been cut at an early stage and the part cut at a later stage, the cutting tool should substantially not be subject to wear. A change in shape is unacceptable because it affects the light spread which can clearly be observed by the viewer. For the same reason it is impossible to replace a worn cutting tool by a new one because then a small but clearly visible change in light spread occurs. For this reason only diamond is suitable as a material for the cutting tool. However, this presents the problem that it is not possible to give a diamond cutting tool the required concave shape as described in the said Patent.

Owing to these limitations a screen has to be accepted whose elements provided at the front side have a color spread which is less than optimum so that some color shift remains.

OBJECTS AND SUMMARY OF THE INVENTION

One of the objects of the invention is to provide a rear projection screen which, in spite of the said technical limitations, may have a large surface area and exhibits substantially no noticeable color shift.

To this end the projection screen according to the invention is characterized in that the rear side of the plate is provided with parallel-arranged second light-spreading elements which extend mainly in the same direction as the first light-spreading elements for spreading the light already upon its entrance into the plate in a plane perpendicular to said direction. It has been found that the use of the second light-spreading elements at the rear side of the screen is an adequate remedy against the color shift which results from the less than optimum shape of the first light-spreading elements.

It is to be noted that it is known per se from EP-A 0,281,690 to provide a screen at both its front side and its rear side with a relief structure for spreading the light. In the known screen the light-spreading elements at both sides are, however, perpendicular to one another. Consequently, the elements at the front side ensure horizontal spreading of the light and the elements at the rear side ensure vertical spreading of the light. The function of the elements at the rear side is thus comparable with the roughening or diffusor in the screen described in U.S. Pat. No. 4,573,764. The known elements do not have a function in reducing the color shift.

An embodiment of the projection screen according to the invention is further characterized in that the pitch of the second light-spreading elements is considerably smaller than the pitch of the first light-spreading elements. The projection screen is preferably further characterized in that the pitch of the second light-spreading elements is at most approximately 1/5 of the pitch of the first light-spreading elements. Since the second light-spreading elements are much smaller than the light-spreading elements at the front side, there is no noticeable Moiré interference. As a result, the light-spreading elements at the rear side need not register with respect to the elements at the front side, i.e. it is not necessary to maintain a fixed relationship between the elements on both sides of the plate. A ratio of approximately 1:5.5 between the pitch at the front side and at the rear side of the screen is acceptable as a compromise between reducing the Moiré effect and the manufacturing requirements.

Since the first and second light-spreading elements need not have a fixed relationship with respect to one another, it is not necessary for these elements to be provided accurately in the same direction. The projection screen according to the invention is preferably characterized in that the second light-spreading elements extend in a direction at an angle of at most 30° to the direction in which the first light-spreading elements extend. By arranging the light-spreading elements at the rear side in such a way that they are not parallel to those at the front side, the second light-spreading elements contribute to the spreading of light in the vertical direction. The angle between the first and second light-spreading elements should, however, become not too large because then the effect envisaged by the invention is lost and color errors may be introduced.

An embodiment of the projection screen according to the invention is characterized in that the second light-spreading elements refract light within is substantially perpendicularly incident on the rear side of the screen through an angle which is at most approximately 20°. It has been found that this angle is sufficient to eliminate the noticeable color shift and that the elements at the rear side only show a small relief which is an advantage for the manufacturing possibilities of the plate.

The rear projection screen according to the invention may also be characterized in that the maximum angle between the surface of the second light-spreading elements and the plane of the plate has a value of between approximately 20° and approximately 40°. The conventional materials for a projection screen such as polymethyl methacrylate (PMMA) have a refractive index n of approximately 1.5. The said geometrical angles of approximately 20° and approximately 40° result approximately in the above-mentioned deflection at this value of n.

An embodiment of the rear projection screen according to the invention is characterized in that the second light-spreading elements are convex elements. Another embodiment is, however, characterized in that the second light-spreading elements are concave elements. A further embodiment of the rear projection screen according to the invention is characterized in that a plurality of the second light-spreading elements is convex and plurality is concave. In this respect this embodiment may be further characterized in that the convex and concave second light-spreading elements alternate with one another. The choice of a given configuration of convex and/or concave light-spreading elements and the precise shape of the convex and/or concave elements depends, inter alia, on the first light-spreading elements at the front side of the screen and the processes used in the manufacture of the screen.

A preferred embodiment of the rear projection screen according to the invention is characterized in that the cross-sections of the second light-spreading elements approximately have the shape of a segment of a circle. In this respect the rear projection screen according to the invention may be further characterized in that a segment of a circle forms an arc of approximately 60°. This shape can be manufactured in a relatively simple way without any technical problems.

The rear projection screen according to the invention is further characterized in that a diffusor is arranged in the plate. By providing a light-scattering power in the mass of the plate, light spreading in the vertical direction is obtained and small impurities in the profiles can be equalized so that a more gradual variation of the light intensity distribution is obtained particularly with respect to the first light-spreading elements.

The rear projection screen according to the invention may be further characterized in that the rear side of the plate is anti-reflective. This reduces both loss of light coming from the primary picture source due to reflection at the rear side of the plate and reflection of ambient light entering through the front side of the plate. The rear side may be made anti-reflective by providing a conventional cladding consisting of one or more layers thereon or by providing it with a microrelief structure as described in the magazine "Optica Acta" vol. 29, no. 7, pp. 993-1009 (1982).

The invention also relates to a rear projection system comprising a plurality of primary picture sources, a plurality of lens systems and a rear projection screen as described hereinbefore for projecting the picture generated by the primary picture source.

BRIEF DESCRIPTION OF THE DRAWING

The above-mentioned and other aspects of the invention will now be described in greater detail with reference to the accompanying drawings.

The drawings show diagrammatically some projection screens and projection systems in which.

DESCRIPTION OF THE PREFERRED EMBODIMENTS

Figure 1:
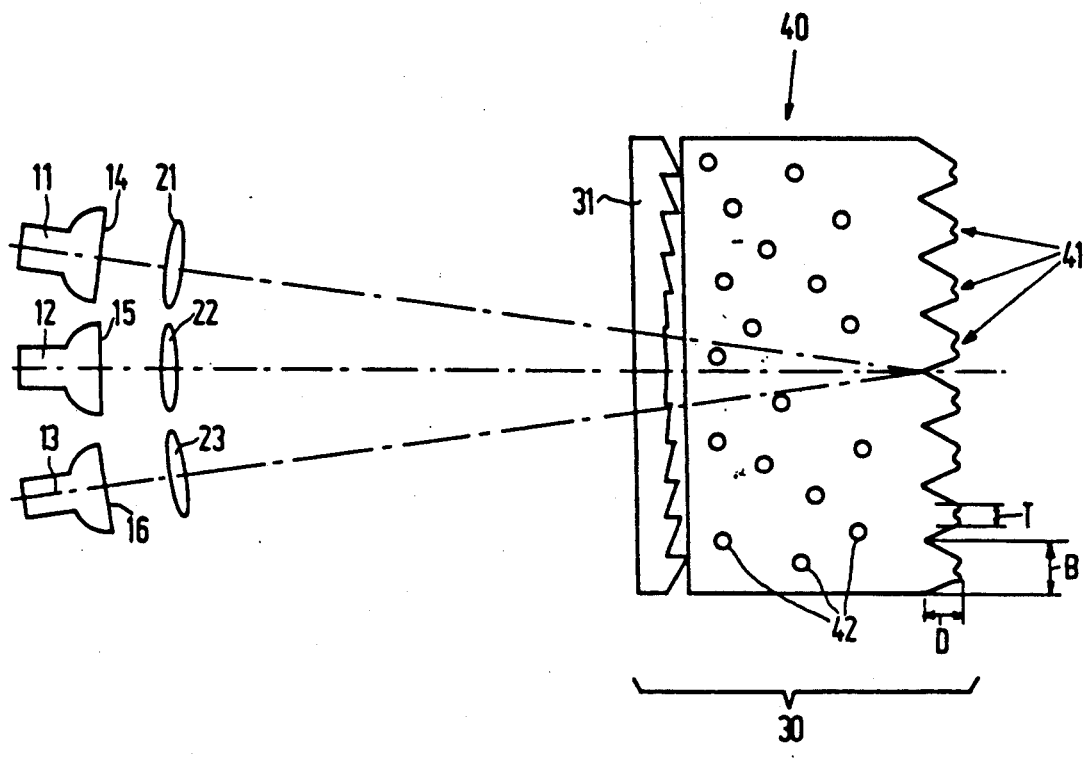
FIG. 1 shows a rear projection system comprising a known rear projection screen of the prior art.

FIG. 1 shows diagrammatically a horizontal cross-section of a rear projection system for displaying a color television or video program, which system comprises a known rear projection screen of the prior art. The mutual dimensions of the various elements are not drawn to scale. In this Figure the reference numerals 11, 12 and 13 show three primary picture sources, for example cathode ray tubes which generate the red, green or blue components of a color video picture on their respective display windows 14, 15 and 16. The picture components thus formed are projected on the projection screen 30 by the projection lens systems 21, 22 and 23 which are shown diagrammatically as single lenses. The screen shown comprises two plates. The rear plate 31 has a Fresnel structure so that the pupils of the projection lens systems are imaged in the audience space. The front plate 40 has elements 41 at its front side which spread the light in the plane of the drawing, i.e. the horizontal plane. These elements extend throughout the height of the screen, transversely to the plane of the drawing. The elements whose top has an indentation have very good properties with regard to the spreading of light in the horizontal direction and the color shift in that plane. Such a structure at which the height D is at least equal to half the width B is described in the previously mentioned U.S. Pat. No. 4,573,764. The spreading of the light perpendicular to the plane of the drawing, i.e. in the vertical direction results, in the screen shown, from a large number of transparent grains 42 incorporated for that purpose in the front plate 1 whose refractive index deviates from the refractive index of the plate material.

Figure 2:
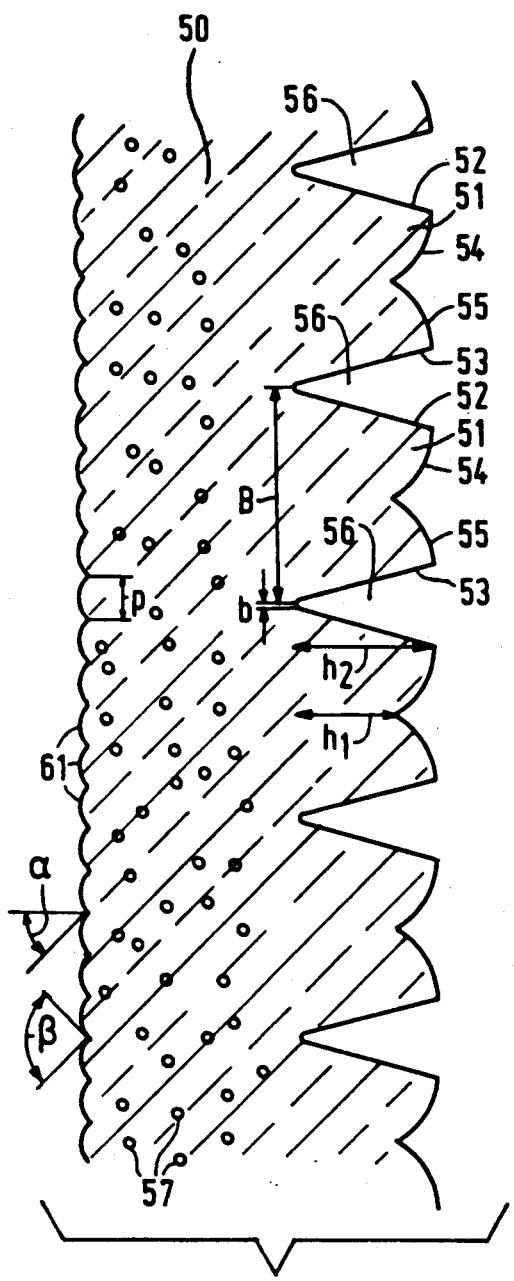
FIG. 2 is a cross-section of a part of the rear projection screen in which the invention is used.

As already stated in the opening paragraph, it has been found that the provision of this relief structure with a small to very small pitch of at most approximately 1 mm meets with technical difficulties. Due to these technical problems it is preferable to provide the front side of the screen with a relief as shown in FIG. 2. Since this profile has properties which are not as good with regard to color shift, the screen is provided at its rear side with a simple relief having a very small pitch.

The front side of the plate 50 is provided with light-spreading elements 51 which have two steep edges or sides 52 and 53 and a top portion having the cross-section of a curved "V" formed by the intersection of two circular segments 54 and 55 of a circle located against each other. A deep groove 56 has been left between the edges of two adjacent elements. The bottom of this groove 56 is as narrow as possible and preferably the edges 52 and 53 of adjacent elements 50 are directly contiguous.

The dimensions of the relief profile are, for example, as follows. The angle at which the edges extend to the normal of the plate is approximately 15° so that the angle enclosed by adjacent edges is approximately 30°. The width B of the elements is approximately 520 μum and the width b is approximately 20 μm so that the pitch is 540 μm. The height $h_1$ of an element as far as the deepest point of the "V" shaped indentation is, for example 245 μm, and the total height of the element $h_2$ is 340 μm. If desired, these values can be reduced by 50% without detracting from the functions. To reduce the remaining color shift, the rear side of the plate is provided with second light-spreading elements 61 having approximately the cross-sectional shape of a segment of a circle. The angle α between the normal on the surface of an element where it intersects an adjacent element and the normal on the plane of the plate is approximately 30° and hence the angle β which is enclosed between the surfaces of two adjacent elements is approximately 60°. The width p of an element is, for example 100 μm. If necessary, this width can be reduced by 50% and thus be approximately 50 μm. It is not required for the second light-spreading elements 61 to have a fixed position with respect to the first light-spreading elements 51 or to be precisely aligned parallel thereto. To obtain spreading of light in the vertical direction, a bulk diffusor is incorporated in the plate material, for example in the form of transparent grains 57 having a deviating refractive index.

Figure 3:
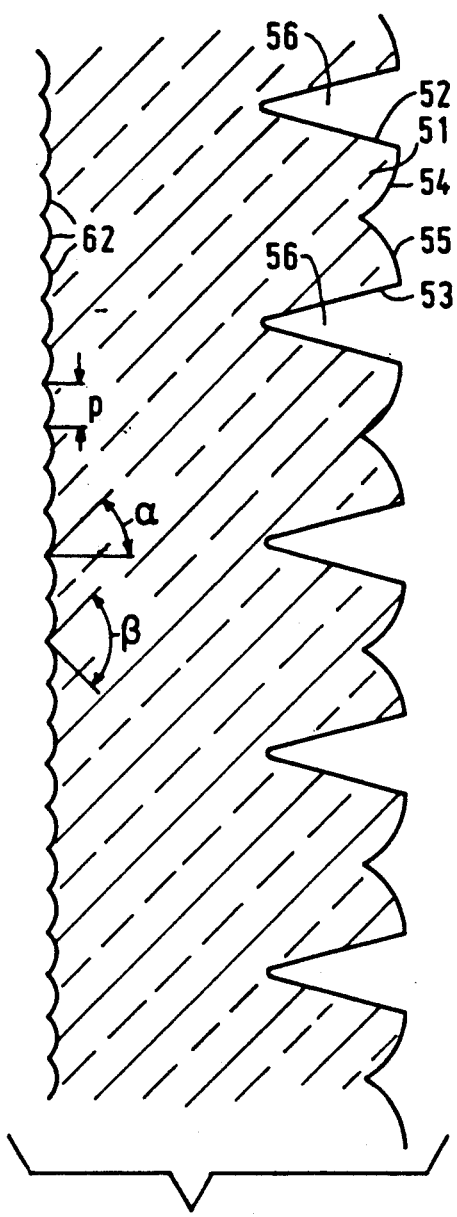
FIGS. 3, 4 and 5 show other embodiments of the rear projection screen according to the invention.

FIG. 3 shows another embodiment of the plate. In contrast to FIG. 2, in which the light-spreading elements at the outer side were convex, the light-spreading elements 62 at the outer side are now concave. When using this plate in a projection television system, the values of the angles α and β and of the width p may be equal to those of the plate shown in FIG. 2.

Figure 4:
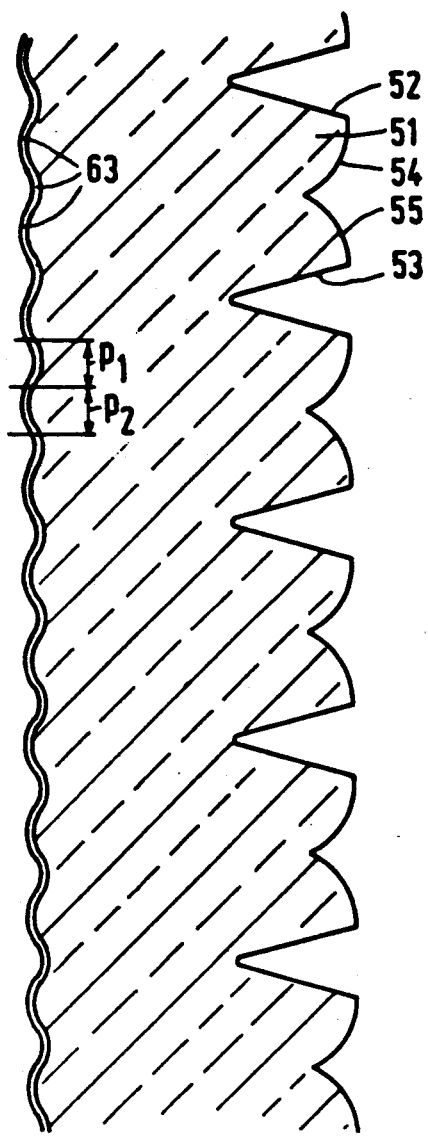

FIG. 4 shows again in a cross-section a third embodiment of the plate. In this Figure the light-spreading elements 63 are alternately convex and concave and they blend with each other. The widths $p_1$ and $p_2$ of the convex and concave elements may be equal or unequal.

The rear side of the screen is made, for example anti-reflective. This can be realised, for example by providing a conventional single-layer or multilayer anti-reflective coating 63 on the rear side, but also by providing the rear side with a fine roughening coated with a layer of constant thickness as described in EP-A-0,131,341. It is also possible to provide the rear side with a microrelief structure which is known as "moth eye structure" and is described, for example in the magazine "Optica Acta", vol. 29, no. 7, pp. 993–1009. This measure can also be used for the screens shown in FIGS. 2 and 3.

Figure 5:
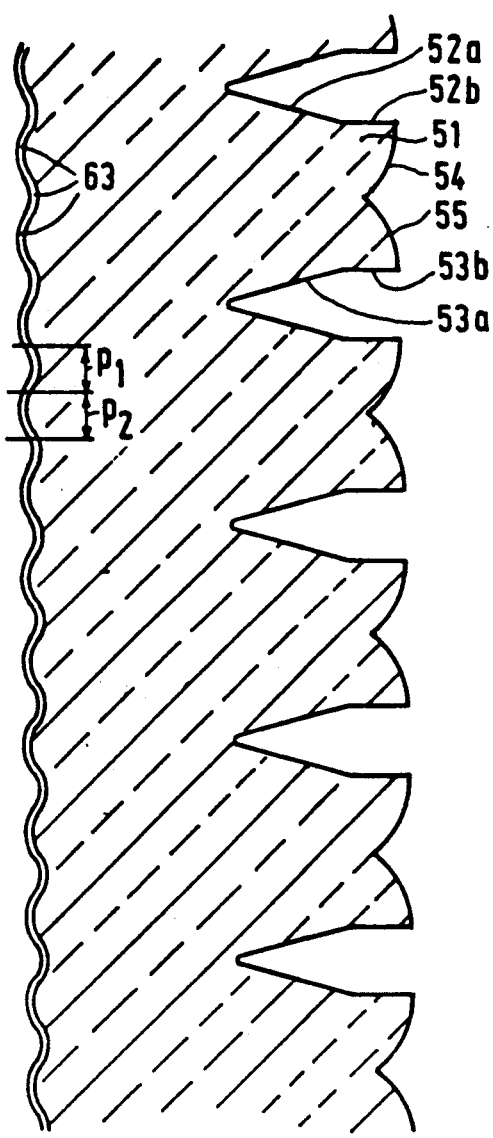

Another embodiment of the screen is shown in FIG. 5, in which light-spreading elements 51 have edges consisting of two segments each, 52a and 52b, 53a and 53b. The segments 52a and 53a are located at the base of the light-spreading elements and extend at a relatively large angle to the normal on the plane of the screen. The adjacent segments 52b and 53b extend at a small angle to the normal or are even perpendicular to the plane of the screen. This shape of light-spreading elements can be combined with any one of the modifications of the structure at the rear side.

Figure 6:
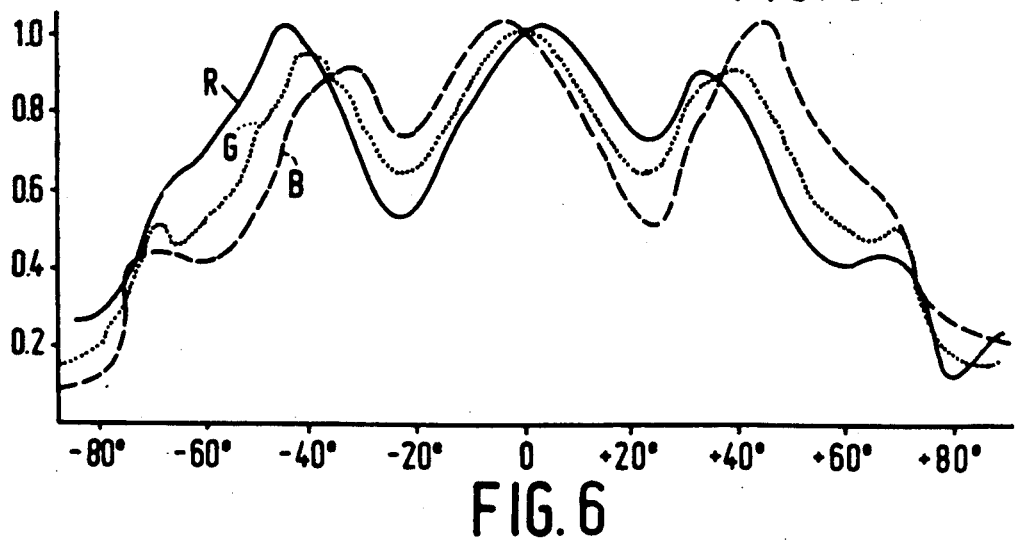
FIG. 6 shows the light intensity as a function of the angle for each one of the three picture sources.

FIG. 6 shows the horizontal spreading of light of a screen according to the invention. The angle of spread is plotted on the horizontal axis and the intensity of the light emerging at the indicated angle from the screen for each of the three primary picture sources R, G and B is plotted on the vertical axis (in arbitrary units).

The graph shows that the light intensity is approximately equal for each one of the three colors and that none of the three colors is clearly predominant within the angle of approximately ±80°.

I claim:

1. A rear projection screen having a front and a rear side for displaying at the front side of the screen a picture supplied by a plurality of primary picture sources arranged at the rear side of the screen, said screen comprising a translucent plate whose front side is provided with a multitude of parallel-arranged first light-spreading elements extending in one direction across the plate for spreading light in a first plane perpendicular to the said direction, said elements having steep edges for obtaining total internal reflection and having a top with a portion for transmission and refraction, characterized in that the rear side of the plate is provided with parallel-arranged second light-spreading elements which extend mainly in the said direction, for spreading light already upon its entrance into the plate in a plane perpendicular to said direction.

2. A rear projection screen as claimed in claim 1, characterized in that the pitch of the second light-spreading elements is considerably smaller than the pitch of the first light-spreading elements.

3. A rear projection screen as claimed in claim 1 or 2, characterized in that the pitch of the second light-spreading elements is at most approximately 1/5 of the pitch of the first light-spreading elements.

4. A rear projection screen as claimed in claim 1 or 2 characterized in that the second light-spreading elements extend in a direction at an angle of at most 30° to the direction in which the first light-spreading elements extend.

5. A rear projection system as claimed in claim 1, characterized in that the second light-spreading elements refract light which is substantially perpendicularly incident on the rear side of the screen through an angle which is at most approximately 20°.

6. A rear projection screen as claimed in claim 1, 2, or 5, characterized in that the maximum angle between the surface of the second light-spreading elements and the plane of the plate has a value of between approximately 20° and approximately 40°.

7. A rear projection screen as claimed in claim 1, 2, characterized in that the second light-spreading elements are convex elements.

8. A rear projection screen as claimed in claim 1, 2, characterized in that the second light-spreading elements are concave elements.

9. A rear projection screen as claimed in claim 1, 2, characterized in that a plurality of the second light-spreading elements is convex and a plurality is concave.

10. A rear projection screen as claimed in claim 9, characterized in that the convex and concave second light-spreading elements alternate with one another.

11. A rear projection screen as claimed in claim 10, characterized in that the cross-sections of the second light-spreading elements approximately have the shape of a segment of a circle.

12. A rear projection screen as claimed in claim 11, characterized in that a segment of a circle forms an arc of approximately 60°.

13. A rear projection screen as claimed in claim 1 characterized in that a diffusor is arranged in the plate.

14. A rear projection screen as claimed in claim 1 characterized in that the rear side of the plate is anti-reflective.

15. A rear projection system comprising a plurality of primary pictures sources, a plurality of lens systems and a rear projection screen as claimed in claim 1 for projecting the picture generated by the primary picture source.

16. A rear projection screen as claimed in claim 3, characterized in that the second light-spreading elements extend in a direction at an angle of at most 30° to the direction in which the first light-spreading elements extend.

17. A rear projection screen as claimed in claim 3, characterized in that the maximum angle between the surface of the second light-spreading elements and the plane of the plate has a value of between approximately 20° and approximately 40°.

18. A rear projection screen as claimed in claim 4, characterized in that the maximum angle between the surface of the second light-spreading elements and the plane of the plate has a value of between approximately 20° and approximately 40°.

19. A rear projection screen as claimed in claim 3, characterized in that the second light-spreading elements are convex elements.

20. A rear projection screen as claimed in claim 4, characterized in that the second light-spreading elements are convex elements.

21. A rear projection screen as claimed in claim 6, characterized in that the second light-spreading elements are convex elements.

22. A rear projection screen as claimed in claim 3, characterized in that the second light-spreading elements are concave elements.

23. A rear projection screen as claimed in claim 4, characterized in that the second light-spreading elements are concave elements.

24. A rear projection screen as claimed in claim 6, characterized in that the second light-spreading elements are concave elements.

25. A rear projection screen as claimed in claim 3, characterized in that a plurality of the second light-spreading elements is convex and a plurality is concave.

26. A rear projection screen as claimed in claim 4, characterized in that a plurality of the second light-spreading elements is convex and a plurality is concave.

27. A rear projection screen as claimed in claim 6, characterized in that a plurality of the second light-spreading elements is convex and a plurality is concave.

* * * * *